(12) United States Patent
Greguš-Kollár et al.

(10) Patent No.: US 10,801,780 B2
(45) Date of Patent: Oct. 13, 2020

(54) CAB/MAAR CONCEPT IMPROVEMENT

(71) Applicant: HANON SYSTEMS, Daejeon (KR)

(72) Inventors: Ján Greguš-Kollár, Skalica (SK); Josef Lapčík, Sušice (CZ)

(73) Assignee: HANON SYSTEMS, Daejeon (KR)

( * ) Notice: Subject to any disclaimer, the term of this patent is extended or adjusted under 35 U.S.C. 154(b) by 217 days.

(21) Appl. No.: 15/875,198

(22) Filed: Jan. 19, 2018

(65) Prior Publication Data
US 2018/0238626 A1   Aug. 23, 2018

(30) Foreign Application Priority Data

Feb. 20, 2017   (DE) .................. 10 2017 202 667

(51) Int. Cl.
| | | |
|---|---|---|
| B21D 53/02 | (2006.01) | |
| F28D 1/02 | (2006.01) | |
| F28F 1/02 | (2006.01) | |
| F28D 1/053 | (2006.01) | |
| F28F 9/16 | (2006.01) | |
| B23P 15/26 | (2006.01) | |

(52) U.S. Cl.
CPC ............ F28D 1/0233 (2013.01); B23P 15/26 (2013.01); F28D 1/05358 (2013.01); F28D 1/05366 (2013.01); F28F 1/025 (2013.01); F28F 9/165 (2013.01); *F28F 2275/125* (2013.01)

(58) Field of Classification Search
CPC ............ F28D 1/0233; F28D 1/05366; F28D 1/05358; F28F 1/025; F28F 9/165; F28F 2275/125; F28F 1/12; F28F 1/126; F28F 9/0229; F28F 9/14; F28F 9/0226; B23P 15/26; B21D 53/085; B21D 41/02; B21D 41/021; B21D 41/025–028

See application file for complete search history.

(56) References Cited

U.S. PATENT DOCUMENTS

| | | | | |
|---|---|---|---|---|
| 427,240 | A * | 5/1890 | Nason ................... | B21D 39/06 29/512 |
| 2,679,681 | A * | 6/1954 | Resler ................. | B21D 41/025 72/324 |
| 4,459,917 | A * | 7/1984 | Michael .............. | B21D 53/085 165/150 |
| 5,901,784 | A * | 5/1999 | Potier .................... | F28F 9/165 138/109 |
| 6,412,547 | B1 * | 7/2002 | Siler ....................... | F28F 9/001 165/149 |

(Continued)

FOREIGN PATENT DOCUMENTS

| | | |
|---|---|---|
| DE | 19723939 A1 | 12/1998 |
| DE | 102015113905 A1 | 2/2016 |

(Continued)

*Primary Examiner* — Jun S Yoo
(74) *Attorney, Agent, or Firm* — Shumaker, Loop & Kendrick, LLP; James D. Miller

(57) ABSTRACT

A method for manufacturing a heat exchanger, wherein a firmly bonded connection is provided between tubes and ribs in order to form a radiator matrix, the connection provided by aligning and inserting tube ends into openings in a first and second collector in order to connect tubes to the two collectors, and a wall section of shaped tube ends is bent so that the tube ends are fixed against the collector through the wall section with interpositioning of a seal.

19 Claims, 5 Drawing Sheets

(56) References Cited

U.S. PATENT DOCUMENTS

| | | | | |
|---|---|---|---|---|
| 2009/0139703 A1* | 6/2009 | Vet | ................... | F28F 9/0229 |
| | | | | 165/173 |
| 2010/0038063 A1* | 2/2010 | Saumweber | ............ | F28F 9/182 |
| | | | | 165/173 |
| 2014/0041844 A1* | 2/2014 | Lindell | ................... | F28F 1/12 |
| | | | | 165/181 |
| 2016/0054069 A1* | 2/2016 | Armsden | ................... | F28F 9/14 |
| | | | | 165/173 |
| 2017/0122666 A1* | 5/2017 | Jo | ................... | F28F 9/0234 |

FOREIGN PATENT DOCUMENTS

| | | | |
|---|---|---|---|
| EP | 1195573 | A1 | 4/2002 |
| JP | 3015894 | B2 | 3/2000 |
| KR | 101562090 | B1 | 10/2015 |
| WO | 2007009588 | A1 | 1/2007 |

\* cited by examiner

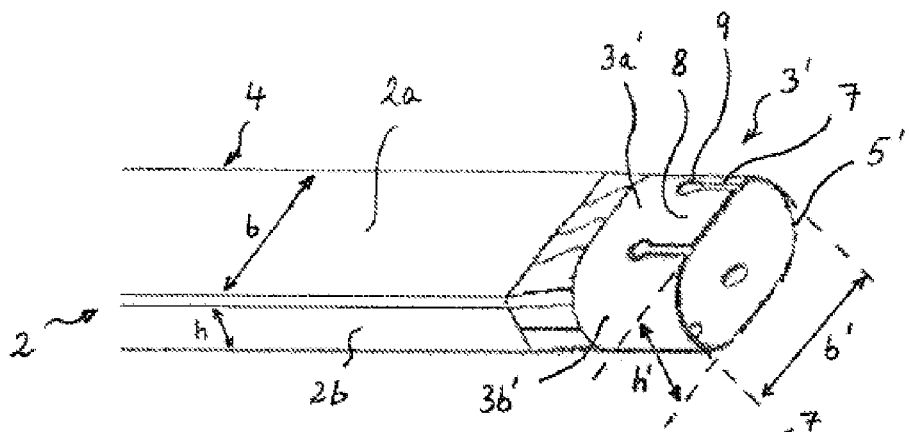
Fig. 3A
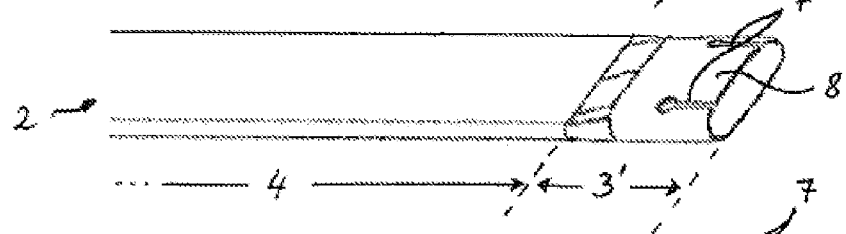
Fig. 3B
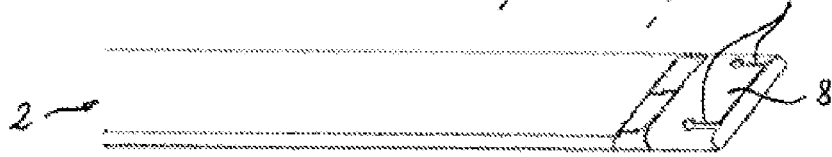
Fig. 3C
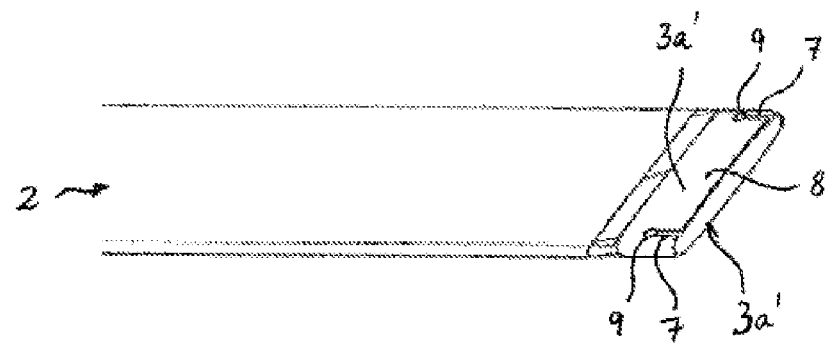
Fig. 3D
Fig. 4A                Fig. 4B

CAB/MAAR CONCEPT IMPROVEMENT

CROSS-REFERENCE TO RELATED PATENT APPLICATIONS

This application claims priority to German Patent Application No. 102017202667.7 filed on Feb. 20, 2017, the disclosure of which is incorporated herein by reference in its entirety.

FIELD

The present invention relates to a heat exchanger and to a method for manufacturing and assembling a heat exchanger, and in particular an airflow heat exchanger which is assembled with a soldering method in a controlled atmosphere (CAB=controlled atmospheric brazing) and with the aid of a mechanical assembly method (MA=mechanical assembly).

BACKGROUND

In general, motor vehicles are equipped with an engine cooling system comprising a heat exchanger, usually designated as a radiator. Heat from the engine is transferred when the engine is running to a coolant flowing through it. The coolant subsequently flows from the engine through a series of lines to the heat exchanger, to which the heat from the coolant is given off to the cool air flowing through from the outside. This process is continually repeated and cools the engine.

Heat exchangers are also used in intermediate radiators of turbochargers and compressors and for the supplementary cooling of structural components for the current supply in electrical vehicles.

A heat exchanger generally comprises a series of parallel tubes which form the heat exchanging section designated as the matrix and empty at their ends into a chamber designated as the collector. A liquid coolant flows through an inlet into one of the collectors and is transported from there through the parallel tubes to the other collector, from which it flows out through an outlet. An airflow flowing through between the tubes brings about the removal (dissipation) of the heat contained in the coolant. In order to increase the surface of the matrix and therefore its ability to dissipate heat, the tubes are usually connected by a series of ribs which either extend parallel to each other and vertically to the tubes or in a zigzag arrangement between the tubes.

While the collectors can be manufactured partially or completely from a plastic material, the matrix of the heat exchanger consists of metal, for example, of an aluminum alloy. The collector comprises a bottom plate which also usually consists of metal and to the ends of which the tubes are connected. The side walls of the collectors can consist of metal, wherein they are sometimes frequently manufactured from a plastic material which is fastened to the metallic bottom plate, for example, by corrugations in the metal. In addition, a seal, for example a flexible, compressible ring seal is provided which extends around the connection position between the bottom plate and the sidewalls of the collector and ensures the necessary sealing in the coolant circuit standing under pressure.

Two methods are known for manufacturing such heat exchangers. The first method uses the high-temperature hard soldering based on a fluxing agent in a regulated atmosphere (CAB=controlled atmosphere brazing) in order to connect the metallic tubes of the matrix to the metallic part (bottom plate) of the collectors. Such a CAB method is designated in the following as a "heat- and joining method".

The other known method for manufacturing such heat exchangers avoids the welding or soldering of adjacent metallic structural components and uses instead a mechanical assembly (MA=mechanical assembly) of the matrix and of the collectors. In the present specification such compounds manufactured without welding or soldering are designated as "mechanical connections" or "mechanically connected". Adjacent structural components are held together here mechanically by separate contact structural components which are not otherwise connected to each other.

In the CAB process, flat tubes of metal are spaced with the aid of metallic ribs which extend over the intermediate space between the tubes, in general in a zigzag pattern. In many CAB heat exchangers the tubes each comprise a single conduit or alternatively a pair of individual conduits arranged adjacent to one another which are separated by a separating wall extending in the longitudinal direction and which therefore form a double conduit. The tubes are in general oblong and substantially rectangular in cross section and comprise two opposing, substantially flat side surfaces and two opposing, curved, short side surfaces or side ends. The ribs are soldered onto the long side surfaces and do not extend over the limitation of the short sides. The particular tube ends are inserted into openings in the metallic bottom plates of the collectors, wherein the slot dimension between the adjacent metallic structural components is held below approximately 0.15 mm so that the slots can be sealed with soldering paste and therefore when passing through the soldering furnace a soldered connection is made between the structural components, i.e., the tube and the bottom plate of the collector. The metallic structural components are made from an aluminum alloy in order to make a high thermal conductivity available.

In the MA method, ribs and tubes as well as the collectors are held together by a non-positive or mechanical connection. The ribs always extend at a right angle to the tubes instead of being folded or corrugated in such a manner like when the CAB method is used so that they extend along the tubes and therefore have openings through which the tubes pass. In this arrangement the ribs are arranged closely adjacent and parallel to each other and usually extend between the front and the backside of the matrix. The tubes have a circular cross section and therefore have at first a smaller diameter than the diameter of the rib openings through which the tubes are inserted. All metallic structural components consists of aluminum alloy in order to make a high thermal conductivity available. A tool called a "projectile", whose diameter is greater than the initial inside diameter of the tubes, is driven into the inside of each tube in order to widen it and therefore press against the openings in the ribs. In this manner, the ribs are fastened with the aid of a mechanical connection to the tubes. The bottom plates of each collector also have openings for the tube ends, wherein the openings leave enough room for sealing elements consisting of plastic or rubber which are inserted between the metallic material of the tubes and the bottom plates. There are a number of methods known for making the seal tight, for example, the using of a conical tool which is pressed into the tube ends in order to widen it mechanically and to compress the seal in this manner.

Each method has certain advantages and disadvantage over the other one. Therefore, heat exchangers which were assembled with the aid of the CAB method make a greater ability of transferring heat available for a given heat exchanger size and are moreover mechanically more robust on account of the flat tubes used which extend between the front and the back side of the heat exchanger since this protects the ribs. A disadvantage to be considered is, however, the fact that the soldering method requires long passage times through an expensive soldering furnace. In addition, the radiator tubes are subjected during the operation of the engine and of the cooling system to an alternating thermal stress (rise and fall of the temperature of the structural components of the heat exchanger), which leads to stresses since adjacent tubes can expand differently and therefore axial stresses are exerted on a given tube by adjacent tubes.

In order to increase the thermal transfer performance, the tubes are arranged in such a manner adjacent to each other that the surfaces of adjacent tubes lie opposite each other and form a space for the ribs between the tubes through which cool air can flow from the outside. This geometry of the tubes is advantageous in as far as that it forms a relatively large surface over which cool air can flow without hindering the airflow through the heat exchanger too much. However, on the other hand such types of collector/tube combinations are problematic on account of the concentrations of tension along the collector/tube connections, in particular around the tube ends and where the tube walls are very curved, because the thermal expansion of the heat exchanger is generally not uniform during operation so that fissures can form in certain parts of the heat exchanger depending on the pattern of the flow of the cooling agent, which lead to leakages and the premature failure of the heat exchanger.

The MA method avoids the using of a cost-intensive soldering furnace and can therefore be used for manufacturing less expensive heat exchangers. Since the connections between the tube ends and the collectors are of a mechanical type, the pressure connections can be designed in such a manner that they allow a certain longitudinal movement between the tubes and the collectors which occurs on account of different thermal expansions during the heating and cooling of the heat exchanger. A completely mechanically assembled heat exchanger therefore substantially reduces or eliminates the thermal tensions between the components of the heat exchanger so that the reliability and service life of the heat exchanger are increased. Such heat exchangers are, however, less efficient for thermal transfer for a given size so that mechanically connected heat exchangers must be larger in order to make the same thermal transfer performance available like that of a CAB heat exchanger of a given size. Furthermore, structural space must be provided for such a larger MA heat exchanger.

Moreover, in a heat exchanger assembled with the MA method, the ribs, which extend parallel to each other from the front side to the back side of the circular radiator tube, are also less robust that the ribs of a heat exchanger manufactured with the aid of the CAB method, which ribs are built in in a zigzag arrangement between the flattened tubes. Here the ribs are necessarily thin, ca. 0.1 mm thick in order to maximize the heat transfer performance; such ribs are, however, already slightly deformed by finger pressure. Since every damage reduces the flow of the cooing air through the heat exchanger and moreover in the case of a motor vehicle radiator stones or gravel can strike the radiator, this accumulated damage reduces the cooling performance of the matrix.

In order to utilize the advantages of both methods, it was suggested in DE 10 2015 113 905 A1 that the tubes and ribs be soldered and subsequently that the tube ends be inserted into the openings of the collectors and connected mechanically to the bottom plates of the collectors with the insertion of a seal. However, it turned out that the tube walls—in particular when flat tubes are used which have a high heat exchange efficiency—are soft after the soldering process and on the one hand can be readily bent, which can damage the rib structure, and on the other hand they tend to tear during the assembly step of the shaping of the tube ends, therefore, a mechanical connection to the collectors, for example by widening the tube ends, is extremely difficult in comparison to MA radiators with their thicker walls.

Therefore, the present invention has the problem of making available a heat exchanger and a method for manufacturing and assembling a heat exchanger which overcome at least a part of the above-cited problems.

SUMMARY

This problem is solved with a method for manufacturing a heat exchanger and a heat exchanger as shown and described herein.

The invention is based on the concept, while retaining the advantages of the radiators manufactured with the CAB method, that is in particular the high thermal conductivity and yet a distinct improvement of the mechanical ability to be loaded and the thermal shock resistance (resistance during thermal alternating loading), of achieving in this manner that instead of the previous CAB/MA construction such as is suggested, for example, in the cited DE 10 2015 113 905 A1, that prior to the firmly bonded connecting, the tube ends are specially shaped and after the assembly of the tubes with the collector the tube walls can be bent in a controlled manner. As a result, the strength (firmness, ability to be loaded) of the tube ends is significantly increased, in particular the resistance to the pressure exerted during operation by the seal on the tube ends. This therefore permits a non-positive, firm seal between the tube ends and the collector.

According to the invention, the method for manufacturing a heat exchanger comprises the following steps: making a first and a second collector available which each comprise a series of openings for receiving tubes; forming a plurality of tubes for the flowthrough of a coolant from the first collector through the tubes to the second collector, wherein each tube comprises a first and a second tube end and comprises a heat exchange section between its ends for transferring heat to an external medium; placing a seal at least into the first collector, wherein the seal comprises holes corresponding to the openings and into which the tube ends of the first and second tubes are inserted; forming a plurality of ribs; shaping at least the first tube ends for forming a wall section of the tube ends which section is to be bent; aligning the tubes and ribs so that the tubes are arranged parallel to each other and that the ribs are arranged between the tubes; a firmly bonded connection of the tubes and ribs in order to form a firmly bonded connection between them and to define in this manner a radiator matrix; aligning and inserting the first and second tube ends into the openings in the first and the second collector in order to connect in this manner the plurality of tubes to the two collectors; bending the wall section of the shaped tube ends so that the tube ends are fixed against the collector through the wall section with interpositioning of the seal.

The shaping of the tube ends takes place in order to create one or more sections on the highly stressed walls of the tube ends with sections are later bent in order to counteract the pressure exerted by the seal on the walls.

The seal provided in accordance with the invention has a general shape of the bottom wall of the collector and the holes in the seal correspond to the openings in the collector, wherein the dimensions of the holes are smaller than those of the openings in order to ensure a sealing contact with the tube ends to be run through the openings. The walls of the holes extend here in a hose-like manner into and through the openings in order to increase in this manner the sealing surface (contact surface) with the tube ends and also with the openings of the collector.

The aligning of the tubes and ribs that fixes the geometry of the radiator matrix takes place in such a manner that the tubes are arranged parallel to each other and the ribs are arranged between the tubes. To this end the tubes and the ribs are as a rule placed into a temporary frame which secures the mutual positioning. The ribs can be oriented so that they are arranged in the zigzag pattern between the tubes.

The firmly bonded connecting of the tubes and ribs subsequently takes place by a heating and joining method, wherein in the case of metallic tubes and metallic ribs a soldering, in particular a hard soldering method like CAB is used. However, other heating and joining methods are conceivable, for example, welding methods. The latter are suitable, among other things, for joining highly heat-conducting plastics. It is especially advantageous here that the high ability to conduct heat of the tubes and ribs is retained in the matrix by the firmly bonded connection, by means of which the cooling performance of the radiator remains on the whole at a maximum and therefore the dimensioning can be reduced in comparison to mechanically constructed radiators.

After the making available of the collector structural group with a seal on the one hand and the firmly bonded, connected radiator with the shaped tube ends on the other hand, in the next step the aligning and insertion of the first and second tube ends into the openings in the first and the second collector takes place in order to connect the plurality of tubes to the two collectors.

If the shaped tube ends have been inserted into the openings and through the holes of the particular collector seal, wall sections of the shaped tube ends are then bent so that the tube ends are fixed by the wall sections against the particular collector. The wall sections press here, for example, against the bottom plate of the collector, wherein the seal is located between the wall section and the bottom plate.

Based on the bending of the wall sections of the tube ends, the connection of the tube ends to the connector is mechanically reinforced since the tube ends are clamped against the collector with interpositioning of the seal. In this manner, the connection can better resist the pressure exerted by the seal. This is particularly significant in the case of very flat tubes, therefore, in such tubes with a high ratio of width to height (aspect ratio) since in such cases the seal exerts a pressure on the long, straight sides which can bend them, which can lead to corresponding leakages. Therefore, as a result of the bending of the wall sections on the long sides of the tube end, this pressure is counteracted and the tightness and service life of the connection is improved. Furthermore, since the seal is flexible, a movable but nevertheless tight connection can be created which also resists alternating thermal stresses for many cycles.

The step of bending the walls of the tube ends comprises the introducing of a punch into the tube ends which presses the wall sections against a bottom plate of the collector. As a result, the bending can take place in a controlled manner and the walls can be especially effectively fixed on the corresponding surfaces of the collector.

Furthermore, the shaping step of at least the first tube ends comprises the addition of a weak area on the tube ends. This weak area which is introduced in particular by a purposeful removal of thickness in predetermined wall sections of the tube ends allows sections of the wall of the tube ends surrounded by the weak area to be bent. It is advantageous to add two or more weak areas.

The weak area is added in the form of a weakening line which is produced either by a purposeful removal of thickness (for example by milling) but also by cutting or stamping the wall. The tube ends can be deformed especially well along the weakening lines and therefore the walls can be especially easily bent.

The step of bending the tube ends comprises the tearing open of the walls of the tube ends at the weak area so that those sections must be bent which make possible the necessary fixing of the tube ends in the collector.

In another advantageous embodiment, the adding of a weak area also comprises the forming of a through hole, in particular of a through round hole in the wall of the tube ends, namely, at the end of the weak area facing away from the tube end. This is especially advantageous since it stops the tearing of the walls at the end of the weak area and therefore allows a controlled tearing. Furthermore, the formation of the holes prevents a further tearing during operation, i.e., over the service life of the radiator.

The one or more weak areas in the walls of the tube and ends define a flap or at least two flaps as a wall section arranged on the long sides of the tube cross section. After the bending, the flaps allow an especially secure fixing of the tube ends on the collector with interpositioning of the seal, wherein the position of the flaps on the longitudinal sides maximizes the fastening surface and therefore makes possible the receiving of the forces being produced during operation (e.g. by the alternating thermal stressing).

The tubes and/or ribs used in the method according to the invention for manufacturing the heat exchanger consist of metal such as, for example, aluminum. However, other materials which are highly conductive of heat are conceivable such as certain plastics which are highly conductive of heat. It is also conceivable to use metallized tubes and/or ribs.

The tubes are furthermore preferably flat tubes, that is, the aspect ratio of the cross section (in the non-shaped state and in the thermal exchange section), therefore the ratio of tube width b to tube height h is greater than 1, wherein values of 2.7 (10.8 mm wide, 4 mm high) up to 16.8 (25.2 mm wide, 1.5 mm high) provide desirable results. Therefore, flat tubes are used, as already initially mentioned, since they on the one hand maximize the surface of the heat exchange section which is flowed against and flowed over by the external medium (e.g. outside air) and therefore the heat transfer performance, and on the other hand make a larger connection surface available for the ribs of the radiator, which makes the radiator matrix more stable.

According to another embodiment, the first and the second collectors are each made available with a series of openings whose cross-sectional shape is different from the cross-sectional shape of the tube ends. For example, the openings in the collectors according to the invention are "rounder" in their cross section, that is, they have a smaller aspect ratio than the flat tubes on their heat exchange section. For this reason, the first and the second tube ends are shaped, according to this embodiment, prior to the step of the insertion of the tube ends into the openings in such a manner that their cross section then corresponds to the cross section of the openings. This applies primarily to the cross-sectional shape, which must be largely identical. However, even as regards the dimensioning the cross sections correspond to each other, wherein the person skilled in the art will naturally take into consideration customary tolerances and oversizes, for example in order to allow a smooth insertion of the tube ends into the opening. Therefore, the prerequisites for an even more effective and in particular more resistant seal between tubes and collector are created since the adaptation of the cross-sectional shape allows the mechanically most favorable shape to be selected for the connection between tubes and collector. For example, in the case of flat tubes, the stability vertical to the flat side is reduced so that by an appropriate selection of the shape of the openings and by shaping, a cross-sectional shape of the tube ends which is more stable in this direction of force can be produced, which improves the mechanical connection.

It should be noted that as a result of the shaping, even other changes and adaptations of the cross sections are possible than the one cited above, for example the shaping of recesses or projections in the cross section of the tube ends in order to engage with appropriate features of the cross section of the openings after the insertion of the tube ends into the collectors and to support the rigidity of the mechanical connection.

The shaping of the first and of the second tube ends changes the aspect ratio of the cross section of the tube ends toward an aspect ratio of 1. This means that a tube end which is at first flat is shaped to a more oval or rounder cross-sectional shape, which makes possible better mechanical properties, in particular resistance to bending vertically to the flat side of the tube.

According to another embodiment, during the step of the bending of the wall sections, the remaining sections of the wall are widened out outwards in order to achieve in this manner the tightness between the tube ends and the seal. The remaining sections of the wall are those sections of the wall which are not bent. Therefore, the seal is based here on a widening of the tube end against the seal in order to achieve the hydraulic tightness. Therefore, the oversize of the tube ends relative to the inside hole in the seal can be kept small in the previous insertion of the first and second tube ends into the openings and correspondingly into the hole of the seal, which results in significantly reduced friction during the insertion into the seal.

For example, it is possible that the cross section of the shaped tube ends has an oversize of 0.1 mm on the outside relative to the inside of the seal and that the other sections of the wall are widened by 0.25 mm outward during the widening out.

Alternatively, the cross section of the shaped tube ends has on the outside an oversize of 0.25 mm relative to the inside of the seal so that the tightness between the ends and the seal is already achieved during the step of the inserting of the first and second ends into the openings of the particular collector. It is advantageous here that no widening of the tube end is necessary for achieving the seal (aside from a professional normalizing of the dimensions which as a result entails a widening of a max. of 0.1 mm). However, a higher friction between the end and the seal during the assembly must also be accepted then. A lubricant can then be used to this end which reduces the friction during the insertion of the ends into the openings and through the hole of the seal.

DRAWINGS

FIG. 3A shows the tube end of a flat tube used for the method according to the invention after the shaping step;

FIG. 3B shows the tube end of a flat tube used for the method according to the invention after the shaping step;

FIG. 3C shows the tube end of a flat tube used for the method according to the invention after the shaping step;

FIG. 3D shows the tube end of a flat tube used for the method according to the invention after the shaping step;

FIG. 4A shows in detail a weakening line formed by shaping the tube ends for forming wall sections of the tube ends which are sections are to be bent;

FIG. 4B shows the change of the cross-sectional shape of the tube end during the shaping according to the invention;

DETAILED DESCRIPTION OF THE EMBODIMENTS

Figure 1:
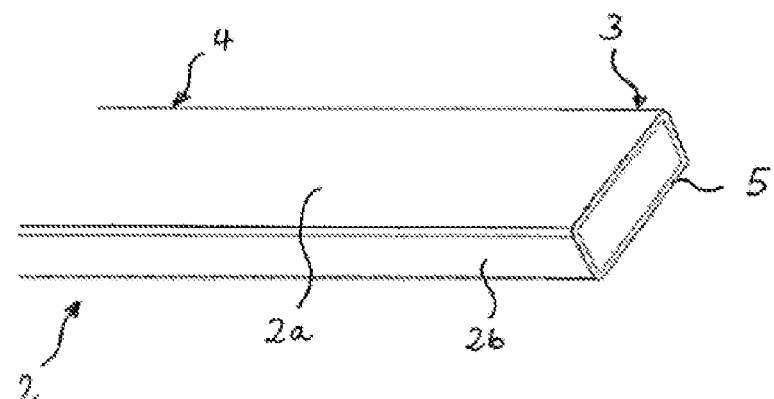
FIG. 1 shows a typical example of a heat exchanger tubes used for the method according to the invention prior to the step of the shaping of the tube ends.

FIG. 1 shows a flat tube 2 such as is used according to the present invention as the initial component of a heat exchanger. This flat tube 2 has wide, opposing side walls 2a and narrow, opposing side walls 2b connecting the latter and with a smaller dimension. In this manner the flat tube has, before the manufacture of the heat exchanger according to the invention, a continuous, rectangular cross-sectional shape which is also characterized on the tube end 3 by the same rectangular cross-sectional shape 5.

A plurality of such tubes 2 as well as the two collectors 20 and the seal 22 which are described later, is made available for the manufacture of a heat exchanger according to the invention.

Figures 2A, 2B:
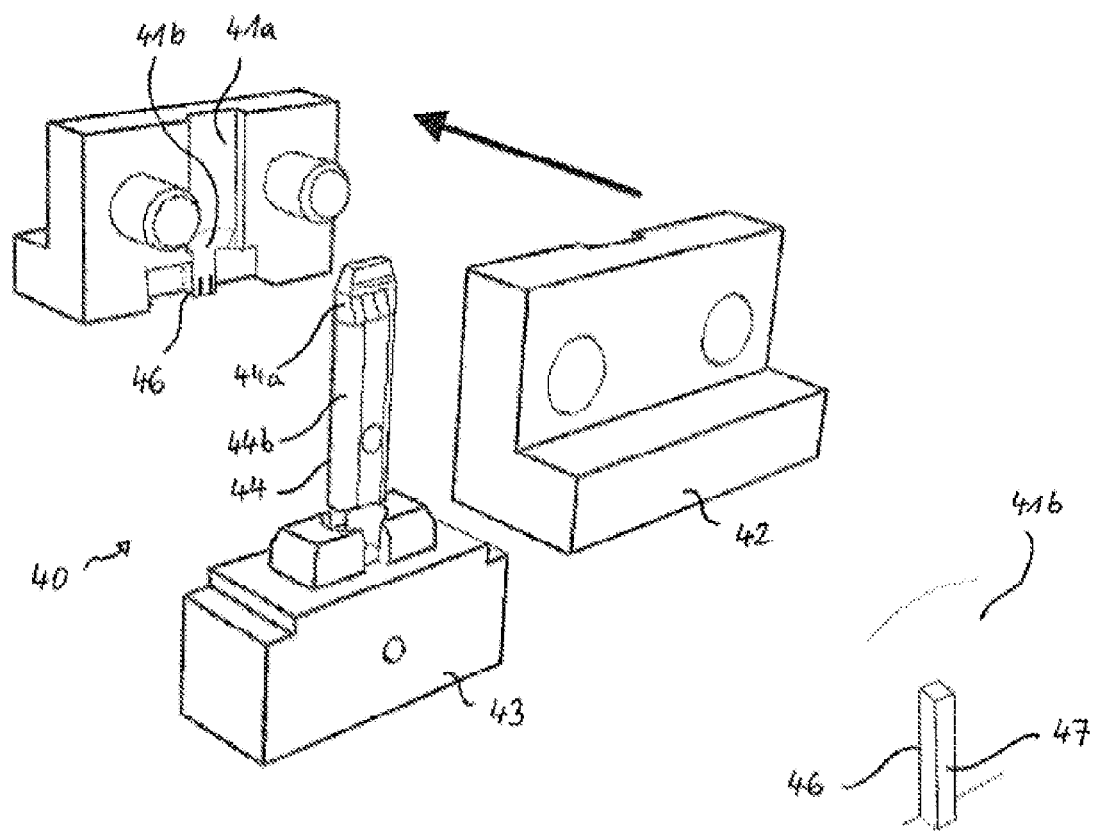
FIG. 2A shows a tool used for the shaping according to an embodiment.
FIG. 2B shows an exemplary embodiment of a detail of the tool in the shape of a stamping element.

In order to manufacture a heat exchanger according to the invention from the tubes 2 with the aid of the method according to the invention, a tool 40 for shaping the tube ends is shown in FIGS. 2A and 2B. This shaping tool 40 comprises two opposing mold halves (dies) 41 and 42 which have on their facing inner surfaces of the outer geometry of the tube to be shaped corresponding mold sections 41a and 41b (shown only for the mold half 41 here). The two tool halves 41, 42 can move toward one another in the direction of the arrow shown in FIG. 2A. The shaping tool 40 furthermore comprises a punch carrier 43 on which a punch 44 is held which extends during the shaping into the hollow mold space formed by the forming sections 41*a*, 41*b* of the two tool halves 41, 42 and is driven into the inside of the tube 2.

The tool halves 41, 42 as well as the shaping punch 44 are designed to shape the tube ends in order to form wall sections to be bent. To this end at least the tool half 41 comprises, for example, one or more stamping elements 46, wherein in the exemplary embodiment of FIG. 2 each mold half 41, 42 comprises two stamping elements 46 which are arranged in the forming section 41*b* (those of the tool half 42 are not visible). Such an exemplary stamping element 46 is shown in FIG. 2B. The stamping elements 46 are shaped in such a manner that they introduce the weak areas 7 shown in FIG. 4 during the closing of the tool 40 in the tube to be shaped, which areas define flaps 8 to be bent in a later method step (see, e.g., FIG. 3A).

The shaping punch 44 shown in FIG. 2A comprises a punch end 44*a* and a following punch shaft 44*b*. The punch end 44*a* has a cross section at its tip which corresponds to the inside of the cross section 5 of the non-shaped tube end 3 (see FIG. 1). The cross section of the punch changes from the tip toward the punch shaft 44*b* to an more oval cross-sectional shape which is then constant along the punch shaft 44*b* and corresponds to the rounder or more oval cross section of the shaped tube end 3' (see FIGS. 3A to 3D).

Therefore, according to the method of the invention the tubes 2 to be shaped are placed into the tool 40, wherein the flat tube 2 is shaped on its tube end 3 by the closing of the tool halves 41 and 42 and the driving in of the punch 44 into the flat tube 2 in such a manner that in the following working steps the desired, firm connection between the tubes and the collectors can be produced without having to do without the necessary flexibility of the fastening for the receiving of forces.

In particular, the tube end is shaped in such a manner during the working with the tool 40 that wall sections 8 to be bent are formed on the tube end 3'. Moreover, the initial cross section 5 of the tube end 3 is advantageously changed in such a manner that it has a "more oval" or "rounder" cross-sectional shape 5' after the working and therefore has improved mechanical properties as will be explained in the following.

FIGS. 3A to 3D show different embodiments of shaped flat tubes like those which can be produced with the shaping tool 40 shown in FIG. 2 in its basic function (wherein a person skilled in the art will naturally adapt the geometry of the mold sections in the tool halves 41, 42). FIG. 3A shows, e.g., a flat tube whose heat transfer section 4 has a dimension of 10.8 mm (longer side 2A)×4 mm (shorter slide 2*b*) whereas in FIG. 3B the dimensions are 10.8 mm×1.6 mm, in FIG. 2C 14 mm×1.8 mm and in FIG. 3D 25.2 mm×1.5 mm.

The shaped tube ends 3' have weak areas 7, 9 according to the embodiment shown and which are shown in detail in FIG. 4A. In particular, the weak areas are formed in the present exemplary embodiment by a purposeful removal of thickness in the predetermined wall sections of the two bends 3' which have in the present case the shape of weakening lines 7. These weakening lines 7 represent recesses in the thickness of the wall 3*a'* of the tube ends which were produced by a reduction of the wall thickness from the original dimension of the wall 3*a'* to the dimension of a thinned wall 7*a* (bottom of the weakening line). Whereas these weakening lines can be produced, for example, by the stamping element 46 of the shaping tool 40 (stamping section 47), it is also possible to place them subsequently after the shaping with the shaping tool 40, wherein the wall, instead of being stamped, can also be formed by cutting, milling or by other methods known to the person skilled in the art. In particular, milling makes a very precise, definable removal of thickness possible.

Furthermore, FIGS. 3 and 4A show the formation of a round hole 9 which is located at the end of the weakening line 7 facing away from the tube end 3' and which completely penetrates the wall thickness of the tube end 3'. The holes 9 are introduced into the walls of the tube ends 3' after the production of the weak areas 7 since it turned out that a penetration of the wall during the formation of the weak areas is not satisfactorily possible. The formation of such holes 9 can also take place by stamping but also by other work methods such as, for example, boring.

As the examples of FIGS. 3A to 3D show, two weakening lines 7 are formed and two round holes 9 are formed on the shaped tube ends 3' on opposite wall sides 3*a'*, wherein the wall sides 3*a'* have a greater dimension b' than the side walls 3*b'* with height h' extended from the side walls 2*b*.

As previously indicated, a flap 8 is defined by the weakening lines 7 in each of the two longer wall sides of the shaped tube end 3', which flap represents the wall section to be shaped. As can be seen from the FIGS. 3A to 3D, the weakening lines 7 are provided in such a manner that the width of the flap 8 approaches as closely as possible the width b of the shaped tube end 3'. As will be apparent in the following, a wider flap additionally increases the strength of the assembly in an advantageous manner.

In FIGS. 3A and 4B the tube 2 has a shaped tube end 3', whose cross section 5' is rounder or more oval than the initial cross section 5 (cf. also FIG. 1). In particular, the aspect ratio b/h of the cross section of the tube end 3 of 2.7 (FIG. 3A: b=10.8 mm, h=4 mm) was reduced to an aspect ratio b'/h'/ of the cross section of the shaped tube end 3' of 1.8, therefore, it was approached to the symmetrical value 1. The cross-sectional shape 5' of the shaped tube end 3' corresponds here to the cross-sectional shape 35 of the opening 33 of the collector 20 (see FIG. 7) with corresponding dimensional tolerances which take into account the seal 22 set in the collector 20.

Figure 5:
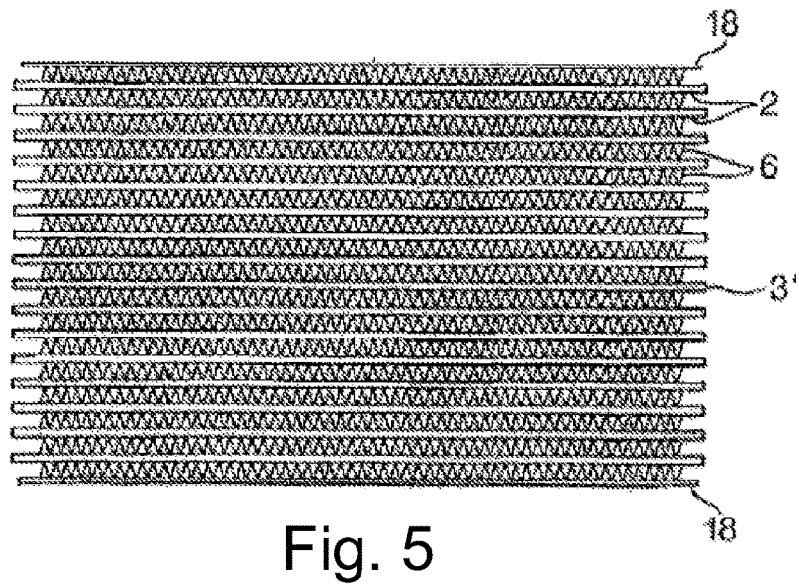
FIG. 5 shows a front top view of the radiator matrix obtained by the aligning and firmly bonded connection of the shaped tubes and ribs.

After the shaping of the tube ends, all tubes 2 and the associated ribs 6 are aligned, for example on a frame which is not shown, so that the tubes are parallel to each other and the ribs are arranged between the tubes. Furthermore, closure strips 18 (firm metal strips) are provided on both sides of the matrix to be formed which increase the mechanical protection of the matrix. The tubes and ribs, which are aligned in this manner, are not connected in a firmly bonded manner, to which end they are introduced into a soldering furnace, which is not shown here, for the carrying out of the CAB method in a controlled atmosphere, through which they run and are therefore soldered to a radiator matrix 10. Such a radiator matrix in which the ribs are arranged in a zigzag arrangement in this example is shown in FIG. 5. It is pointed out that in this view the tube ends 3' have already been shaped but this was not shown for drawing reasons.

Figure 6:
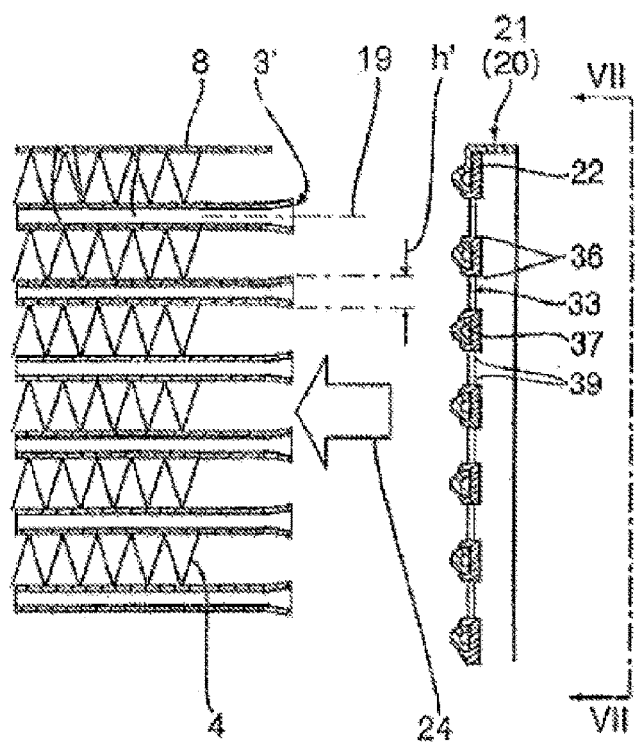
FIG. 6 shows a schematic sectional view (along the line VI-VI in FIG. 7) of the insertion of the tube ends into the openings of a collector.

Finally, in the next step the tube ends 3' can be placed in the openings 33 in the bottom wall (bottom plate) 21 of the collector 20 with an appropriate, previous alignment. As FIG. 6 shows, to this end the collector 20, into which a flexible ring seal 22 with holes 39 corresponding to the openings 33 had been placed, is positioned so that the central axes of the openings coincide with the particular longitudinal axes 19 of the tubes 2, and is then moved in the longitudinal direction of the tubes 2 onto the tube ends 3', indicated by the arrow 24 in FIG. 6.

Figure 7:
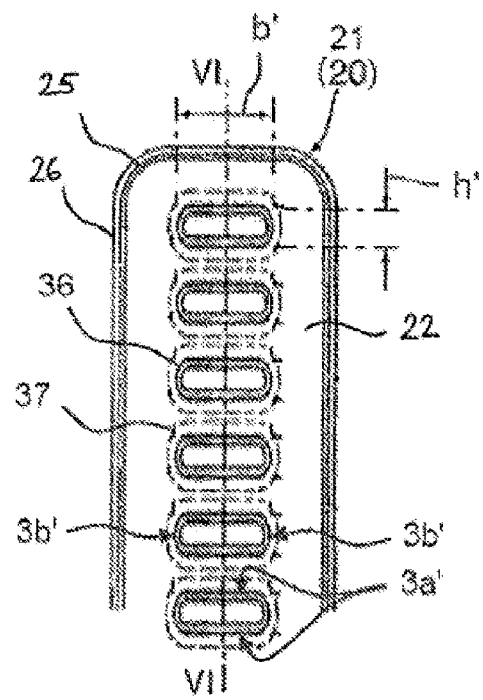
FIG. 7 shows a top side view onto the collector (collector bottom plate) with inserted tubes.

FIG. 7 shows the state after the insertion of the tube ends 3' into the collector 20. The collector 20 has a bottom wall 21 to the inside of which (facing away from the tube ends 3' to be inserted) the seal 22 was attached. The holes 39 of the seal 22 comprise lips 36 surrounding it which extend through the bottom plate 21 and are in contact with the edge 37 of the particular opening 33 in the bottom plate 21. Therefore, each lip 36 makes a sealing section of the seal 22 available between each tube end 3' and the bottom plate 21.

According to a variant of an embodiment the cross sections 5' of the tube ends 3' have a dimension (width b', height h'; cf. FIG. 3A, 4B) which has an oversize of 0.1 mm relative to the dimension on the inside (sealing lip 26) of the hole 39 of the seal 22 so that an especially easy introduction of the tube end 3' through the opening 33 of the collector bottom plate 20 and the opening 39 of the seal 22 is made possible. To this end a widening of the tubes during the closing step of the bending is advantageous.

Alternatively, the oversize of the cross section 5' of the tube ends 3' on the outside relative to the cross section of the inside of the seal can be 0.25 mm. This means that the insertion of the tube ends is associated with a somewhat higher expenditure of force, which can be advantageously eliminated, however, by using a lubricant between the tube end and the seal. Then, a subsequently widening during the bending step is no longer necessary even though a normalizing of the dimensions of the tube end can take place by the bending step described in the following and which results as a rule in widenings of 0.1 mm or less.

Figure 8A:
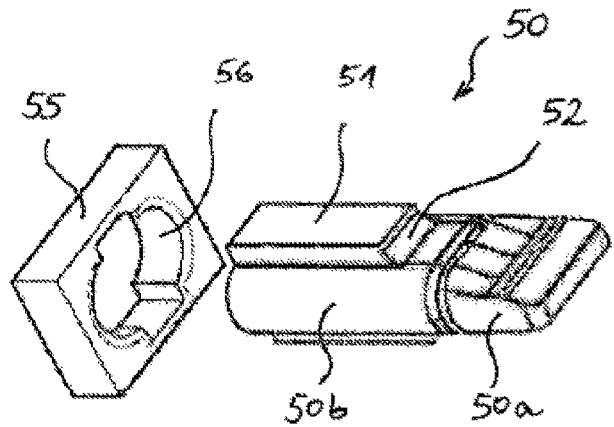
FIG. 8A shows an exploded perspective view of a punch used for bending the wall sections and with stabilizing frame.
Figure 8B:
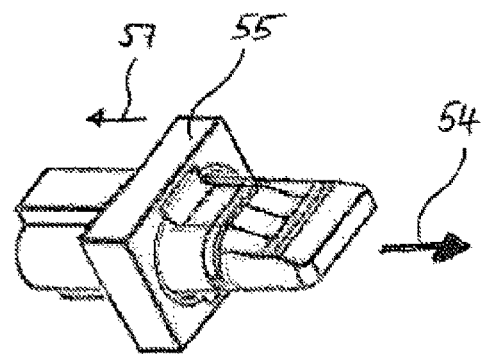
FIG. 8B shows a perspective view of the punch of FIG. 8A used for bending the wall sections and with the stabilizing frame, ready for use.

After the insertion of the tube ends 3' into the openings 33 of the collector bottom plate 20 the bending step of the invention can now be carried out. To this end, as is shown in FIG. 8A, a punch or a punch-shaped tool 50 is used for each tube end, whose general shape substantially corresponds to the shaping punch 44. The punch 50 differs from the latter as a bending tool in that it also comprises a bending section 51 in addition to the punch end 50a, which corresponds to the cross-sectional shaping from the initial cross section of the flat tube 2 to the shaped cross section of the tube end 3' and in addition to the punch shaft 50b, which corresponds to the shaped cross section 5' of the tube end 3'. This bending section 51 has a concave surface section 52 designed to engage with the flap 8 of the tube end 3' and is formed during the shaping.

Furthermore, the bending tool 50 comprises a frame 55 which can shift on the bending tool 50 in the longitudinal direction. This frame 55 has an opening 56 whose geometry corresponds to the shaft section 50b of the bending tool 50 and serves during the bending of the flaps 8 to retain the tube radii of the non-bent sections of the tube wall, wherein it shifts during the introduction of the bending tool 50 into the tube ends 3' in the direction of the arrow 54 on the tube in the opposite direction, shown by the arrow 57.

Figure 9:
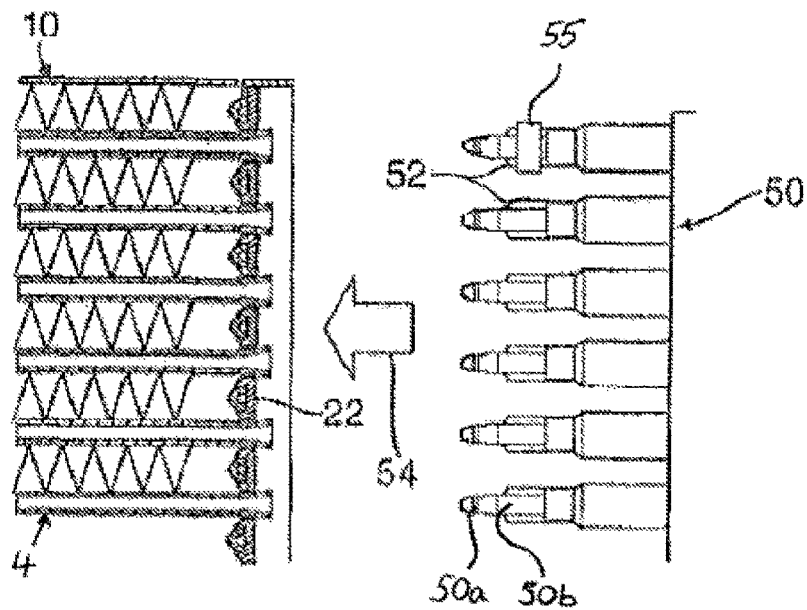
FIG. 9 shows the step of the bending of the wall sections of the shaped tube ends with the aid of the punch shown in FIGS. 8A and 8B.

During the introduction of the punch ends 50a and punch shafts 50b with a bending section 51 which are present in the bending tool 50 according to the number of tubes present in the matrix (FIG. 9), the flaps 8 slide up on the concave surface section 52 of the bending section 51, wherein the material of the walls tears at the weakening lines 7 on account of the force acting outward from the tube onto the flaps 8 so that the flaps 8' are bent like a planing tool. The tearing is ended in a controlled manner by providing the round holes 9 so that no other tears which could adversely affect the structural rigidity of the connection can be produced. This measure proves to be extremely positive for the retention of the connection and therefore for the service life of the radiator. In addition, the flaps 8' are pressed against the sealing lips 36 of the seal 22 by the delivery movement 54 and the seal is pressed for its part against the collector bottom plate 21. It can be provided here that the tube ends are also widened somewhat, for example by 0.25 mm when the oversize of the cross section 5' of the tube end 3' opposite the seal is only 0.1 mm. If a larger, sealing oversize had already been fixed, for example, 0.25 mm, the widening can be eliminated and only a normalizing (≤0.1 mm) takes place.

Figure 10:
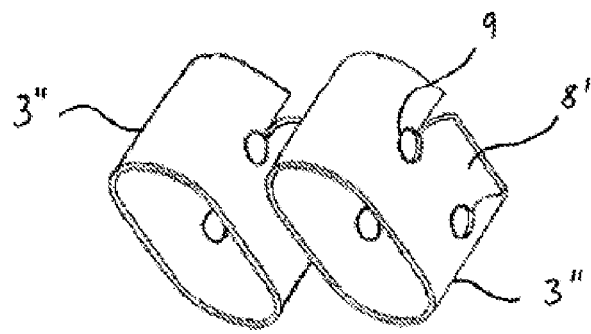
FIG. 10 shows a perspective view of the tube ends after the bending of the wall sections.

FIG. 10 separately shows the bent flap 8' of the now finished, shaped and bent tube end 3". In this manner the bending of the flaps 8 fixes on the one hand the collector mechanically on the tube and on the other hand ensures the tightness of the radiator circuit.

Figure 11:
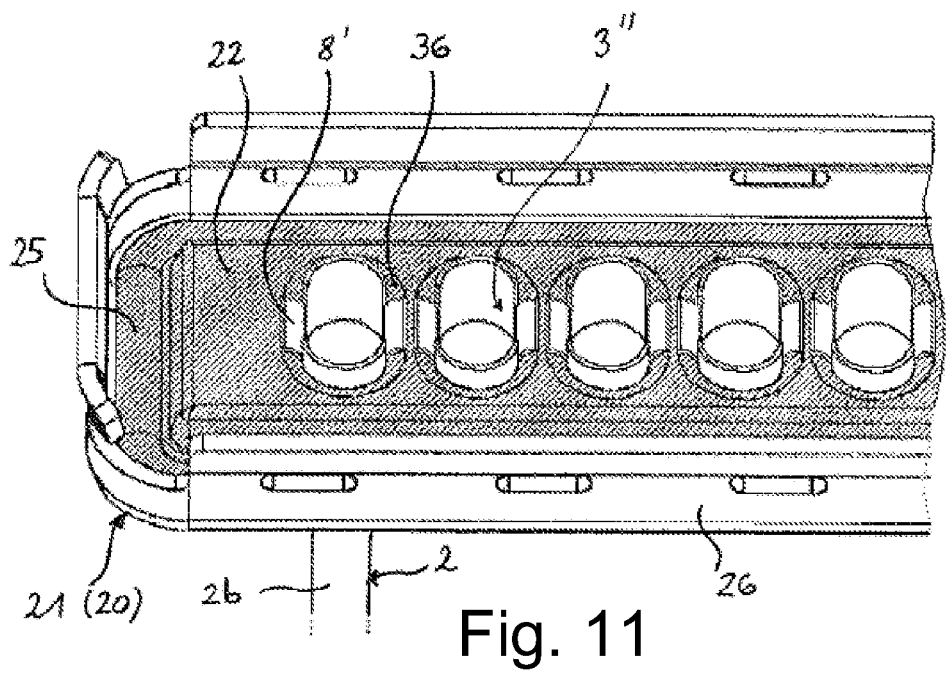
FIG. 11 shows the tube ends fixed on the bottom plate of the collector.

FIG. 11 shows the finished mechanical connection between the tubes 2 to their tube ends 3" and to the collector 20 (collector bottom plate 21) with interpositioning of the seal 22. The seal is clamped in here and can therefore resist the sealing pressure of the coolant flowing in the cooling circuit in an optimal manner. In addition, the seal is flexible, so that a movable yet tight connection is created which also resists alternating thermal loads produced by relative movements between tubes and collector over many cycles.

Figure 12:
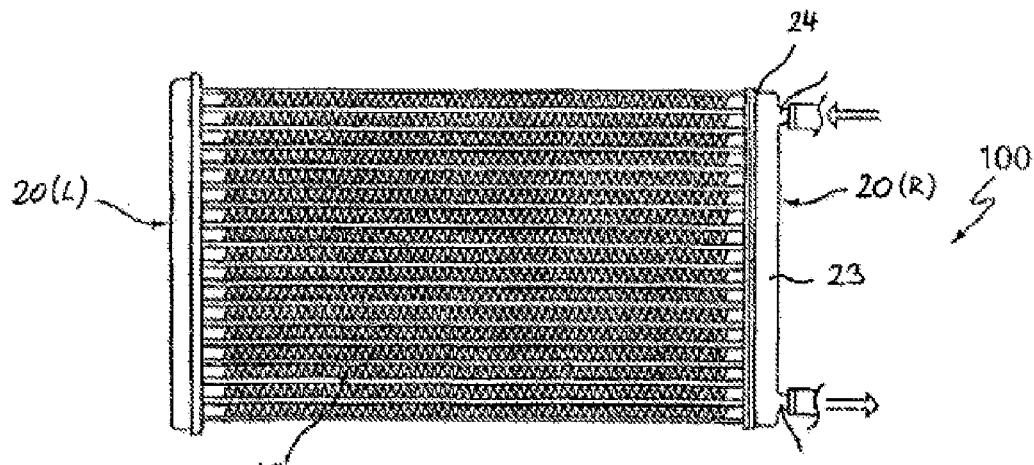
FIG. 12 shows a front top view of the finished, mounted radiator according to the invention.

FIG. 12 shows the assembled radiator 100 ready to be built in which is formed by connecting the collector bottom plate 21 to a collector covering 23. The assembly of each collector 20 is finished by joining the collector covering 23 to the collector bottom plate 21. The collector covering 23 can be manufactured from a metal or a polymer and can be connected to the bottom plate 21 by a seam 24 by traditional means, for example, adhesion, clamping or welding.

In this example the seal 22 has a circumferential edge 25 (see FIGS. 7 and 11) extending around the inside from a longitudinally projecting edge 26 of the collector plate. The edge 25 of the seal 22 is compressed during the connection procedure of the covering 23 by a circumferential lip (not shown) of the covering in order to realize the seal. As a result, the advantage is also made available that the seal can be locally fixed and secured so that it does not slip to the side.

What is claimed is:

1. A method for manufacturing a heat exchanger with the following steps:
   providing a first collector and a second collector, each of the first collector and the second collector further comprising a series of openings receiving tubes therein;
   forming the tubes for flowthrough of a coolant from the first collector through the tubes to the second collector, wherein each of the tubes includes a first tube end and a second tube end and a heat exchange section between the first tube end and the second tube end for transferring heat to an external medium;
   placing a seal at least into the first collector, wherein the seal further comprises holes aligned with the openings;
   forming a plurality of ribs;
   shaping at least the first tube end of each of the tubes for forming a wall section of the tube ends which section is to be bent, wherein the shaping at least the first tube ends further comprises addition of at least one weak area on the shaped tube ends;
   aligning the tubes and the ribs so the tubes are arranged parallel to each other and the ribs are arranged between the tubes;
   bonding the tubes and the ribs to form a connection therebetween and define a radiator matrix;

aligning and inserting the tube ends into the openings in the first collector and the second collector to connect the tubes to the first collector and the second collector; and bending the wall section of the shaped tube ends so the shaped tube ends are fixed against the collector through the wall section with interpositioning of the seal.

2. The method according to claim 1, wherein the step of the bending the wall section of the shaped tube ends further comprises introduction of a bending punch into the shaped tube ends which presses the wall section against the seal.

3. The method according to claim 1, wherein the at least one weak area is introduced by a purposeful removal of thickness in predetermined sections of the shaped tube ends.

4. The method according to claim 1, wherein the at least one weak area is a weakening line produced by cutting or stamping a wall of the shaped tube ends.

5. The method according to claim 4 wherein the step of bending the wall section of the shaped tube ends further comprises tearing open the wall of the shaped tube ends at the at least one weak area.

6. The method according to claim 4, wherein the addition of the at least one weak area further comprises forming a through hole in the wall of the shaped tube ends at an end of the at least one weak area facing away from the shaped tube end.

7. The method according to claim 1, wherein the at least one weak area defines a flap as a wall section.

8. The method according to claim 4, wherein a cross-sectional shape of the openings of the first collector and the second collector is different from a cross-sectional shape of the tube ends prior to shaping and the shaping of at least the first tube end of each of the tubes takes place before the step of inserting the tube ends into the openings in such a manner that a cross-sectional shape of the shaped tube ends corresponds to the cross-sectional shape of the openings.

9. The method according to claim 8, wherein the shaping at least the first tube end of each of the tubes comprises introducing a punch into the tube end to be shaped.

10. The method according to claim 8, wherein the shaping at least the first tube end of each of the tubes changes an aspect ratio (b/h) of the cross sectional shape of the tube ends prior to shaping in a direction of an aspect ratio of 1 after shaping.

11. The method according to claim 8, wherein during the step of bending the wall section, remaining sections of the wall are widened out outwards in order to achieve in this manner a tightness between the shaped tube ends and the seal.

12. The method according to claim 11, wherein the cross sectional shape of the shaped tube ends has an oversize of 0.1 mm on an outside relative to a cross sectional shape of an inside of the seal and the remaining sections of the wall are widened by 0.25 mm outward.

13. The method according to claim 8, wherein the cross sectional shape of the shaped tube ends has on an outside an oversize of 0.25 mm relative to a cross sectional shape of an inside of the seal, so a hydraulic tightness between the shaped tube ends and the seal is achieved during the inserting the tube ends into the openings of the first collector and the second collector.

14. The method according to claim 1, wherein the tubes and/or the ribs consist of metal or are metallized.

15. The method according to claim 1, wherein the connection between the tubes and the ribs is a soldered connection.

16. The method according to claim 1, wherein the tubes are flat tubes.

17. A heat exchanger, comprising:
a first collector and a second collector, each of the first collector and the second collector further comprises a series of openings receiving tubes;
a radiator matrix further comprising:
the tubes parallel to each other for flowthrough of a coolant from the first collector through the tubes to the second collector; and
a plurality of ribs arranged between the tubes, the ribs connected in a bonded manner to the tubes, wherein each of the tubes has a first tube end and a second tube end and a heat exchange section between the first tube end and the second tube end for transferring heat to an external medium; and
a seal at least into the first collector, wherein the seal further comprises holes aligned with the openings and into which the first tube end of each of the tubes is inserted, wherein the first tube end of each of the tubes and the second tube end of each of the tubes are shaped in comparison to the heat exchange section and further comprise a wall section which is bent in such a manner that the first tube end of each of the tubes and the second tube end of each of the tubes are fixed against the first collector and the second collector by the wall section with interpositioning of the seal, wherein at least one weak area is formed on at least one of the first tube end and the second tube end.

18. The heat exchanger according to claim 17, wherein the wall section is a flap defined by torn weakening lines in a wall of the first tube end of each of the tubes and the second tube end of each of the tubes.

19. The heat exchanger according to claim 18, wherein a hole is provided in the wall of the first tube end of each of the tubes and the second tube end of each of the tubes at each end of the weakening lines which faces away from respective ones of the first tube end of each of the tubes and the second tube end of each of the tubes.

* * * * *